United States Patent [19]

Wagner et al.

[11] 4,172,644

[45] Oct. 30, 1979

[54] INTERRELATED EXPOSURE-DURATION AND DIAPHRAGM-SETTING CONTROL SYSTEM

[75] Inventors: Karl Wagner, Munich; Eduard Wagensonner, Aschheim, both of Fed. Rep. of Germany

[73] Assignee: AGFA-Gevaert, A.G., Leverkusen, Fed. Rep. of Germany

[21] Appl. No.: 847,914

[22] Filed: Oct. 27, 1977

[30] Foreign Application Priority Data

Oct. 29, 1976 [DE] Fed. Rep. of Germany ....... 2649674

[51] Int. Cl.² ............................................. G03B 7/10
[52] U.S. Cl. ...................................... 354/31; 354/36; 354/42; 354/44; 354/49; 354/51
[58] Field of Search ....................... 354/31, 36, 37, 38, 354/42, 44, 49, 59

[56] References Cited

U.S. PATENT DOCUMENTS 3,657,987  4/1972  Balicock et al. ........................ 354/42
3,748,974  7/1973  Cochran .............................. 354/31 X

*Primary Examiner*—Michael L. Gellner

*Attorney, Agent, or Firm*—Michael J. Striker

[57] ABSTRACT

An adjustable diaphragm is driven by an adjusting motor. A first light sensor is positioned behind a first light attenuator, and a second light sensor behind a second light attenuator. The attenuators are likewise driven by the adjusting motor. A negative-feedback control circuit actuates the adjusting motor to keep the amount of light incident upon the first light sensor negative-feedback-regulated. As the position of the motor output element changes, the fraction of incident scene light transmitted by the first light attenuator, that transmitted by the second light attenuator, and that transmitted by the diaphragm, vary. The variations in the fraction of light transmitted by the second light attenuator are the same as those in the fraction of light transmitted by the diaphragm, but different from the variations in the fraction of light transmitted by the first light attenuator. For each different value of scene-light brightness, a different respective combination of exposure-duration and diaphragm-setting can be preprogrammed, for subsequent automatic selection of these value combinations in dependence upon scene-light brightness, during operation of the system in the camera.

8 Claims, 2 Drawing Figures

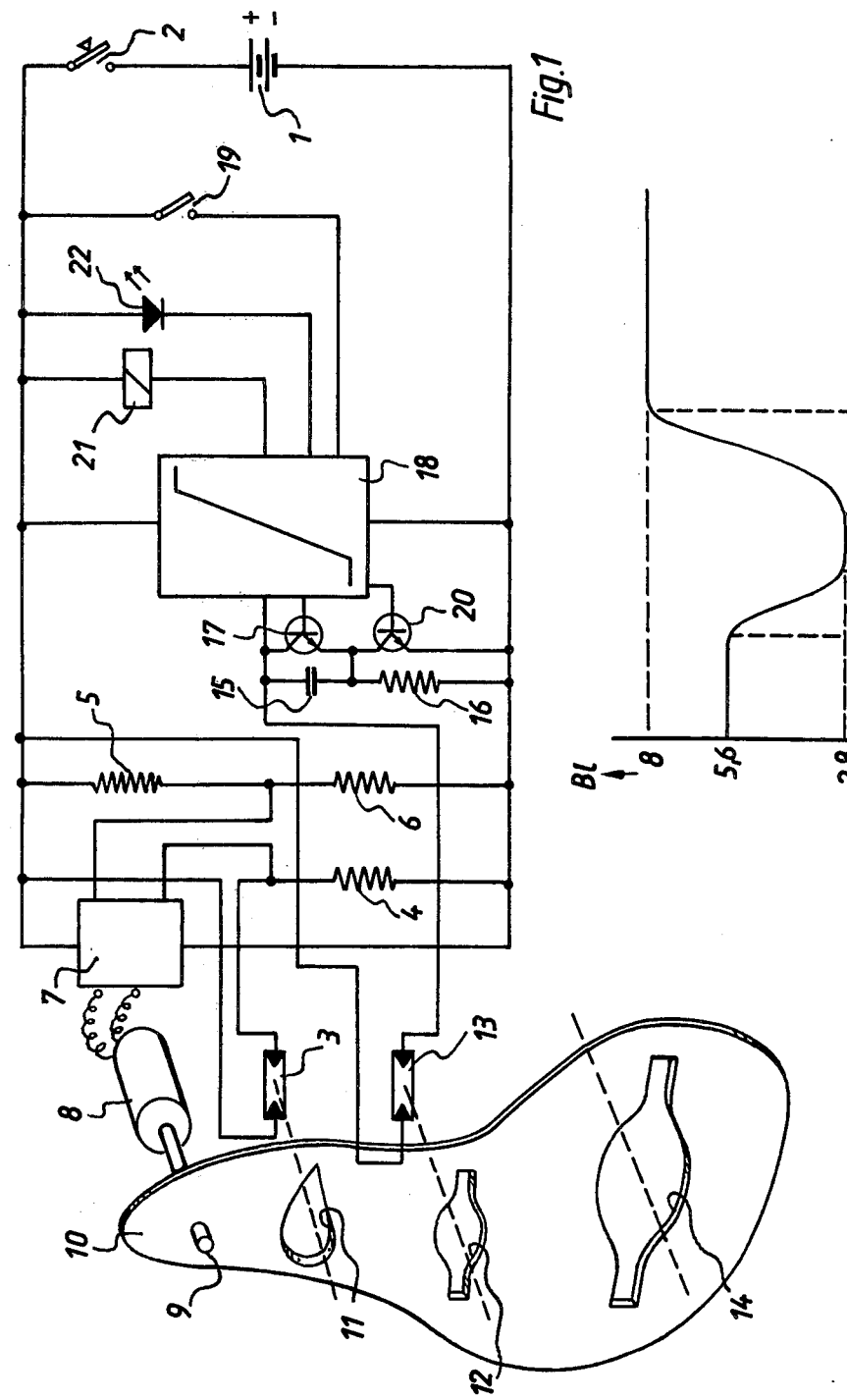

INTERRELATED EXPOSURE-DURATION AND DIAPHRAGM-SETTING CONTROL SYSTEM

BACKGROUND OF THE INVENTION

The invention relates to photographic cameras provided with a negative-feedback diaphragm control system of the type including a light sensor arranged behind a variable light attenuator. The negative-feedback diaphragm control system includes an electromagnetic drive, for instance a D.C. motor, which moves both the movable component(s) of the diaphragm per se and also the variable light attenuator, to thereby vary the attenuation of light incident upon the light sensor. During operation of the negative-feedback diaphragm control system, the system automatically moves both the movable component(s) of the diaphragm and the variable light attenuator arranged in front of the light sensor, in a manner automatically maintaining the intensity of light incident upon the light sensor substantially constant. There is additionally provided an automatic exposure-duration control system, which includes a threshold stage which changes state when its input signal reaches a threshold level, and a light-dependent timing stage connected to the input of the threshold stage. The timing stage applies to the threshold stage a changing input signal which varies in direction toward the threshold level at a rate dependent upon the prevailing brightness of scene light.

With the type of prior-art camera in question, within the range of regulation of the diaphragm control system, the diaphragm setting is automatically adjusted as a function of scene light. However, so long as the diaphragm control system is operating intermediate the limits of its range of adjustment, the amount of light incident upon the light detector of the exposure-duration control system remains constant, i.e., so that the automatically selected exposure duration does not vary as the diaphragm setting is being varied. The automatically selected exposure duration begins to be varied, only when one or the other limit of the range of adjustment of the diaphragm control system has been reached. In other words, the exposure duration selection remains unchanged so long as the diaphragm has not yet been set to its minimum or maximum setting, because a limit of the range of adjustment of the diaphragm control system has not been reached and continued variation of the diaphragm setting may yet bring the system into equilibrium. However, once the diaphragm has already been brought into its minimum or maximum setting, and the system is still not in equilibrium, then the exposure duration selection is changed, in an attempt to establish the conditions for a proper exposure in this way.

This type of diaphragm-setting/exposure duration program is disadvantageous. Considering first, second and third ranges of scene brightness values, the diaphragm setting is automatically varied but the exposure-duration selection not varied within the second range of scene brightness values, whereas in the neighboring first and third ranges of scene brightness values the exposure-duration selection is varied but not the diaphragm setting.

SUMMARY OF THE INVENTION

It is a general object to provide a photographic camera of the type in question, but its control system so designed that the exposure-duration selection is automatically varied even while the negative-feedback diaphragm control system is still operating intermediate the limits of its range of adjustment.

Somewhat more generally, it is an object of the invention to provide a diaphragm-setting and exposure-duration control system of such a design as to make easy the establishment of any desired pair of exposure-parameter values (diaphragm setting and exposure duration) for each different value of scene-light brightness.

In the preferred embodiment of the invention, this is accomplished using first and second light-attenuating means. The first light-attenuating means is arranged in front of a first light detector, connected in the negative-feedback diaphragm control circuit. The second light-attenuating means is arranged in front of a second light-detector, connected in the timing stage of the exposure-duration control circuit. The electromagnetic drive of the negative-feedback diaphragm control system, e.g., a rotary D.C. motor, moves the first light-attenuating means, the second light-attenuating means and the adjustable component(s) of the diaphragm, in the course of attempting to maintain constant the amount of light incident upon the first light detector.

The fractional-light-transmission versus motor-position relationship of the second light-attenuating means differs from that of the first light-attenuating means, but is the same as that of the adjustable diaphragm. The fractional-light-transmission versus motor-position relationship of the first light-attenuating means (located in front of the light sensor of the diaphragm control circuit) is a preselected decreasing relationship. The adjusting motor of the diaphragm control system, as usual, adjusts the first light-attenuating means in a sense keeping the scene light incident upon the first light detector substantially constant, and thereby adjusting the diaphragm setting. However, in the course of doing this, the adjusting motor simultaneously adjusts the second light-attenuating means, thereby changing the exposure-duration selection. Because the fractional-light-transmission versus motor-position relationship of the adjustable diaphragm and of the second light-attenuating means are the same, it becomes possible to preselect a different respective combination of diaphragm setting and exposure duration for each and every value of scene brightness included within the operative range of the system. In this connection, it is particularly important that the fractional-light-transmission versus motor-position relationship of the first light-attenuating means be different from that of the second light-attenuating means and different from that of the diaphragm.

In the preferred embodiment of the invention, the first and second light-attenuating means and also structure defining the diaphragm aperture are all formed as a single pivotably mounted unit, pivotable by the adjusting motor of the diaphragm control system. The adjusting motor may be a moving-coil (galvanometric) device, an ordinary rotary D.C. motor, a stepper motor, or the like. Preferably, the first and second light-attenuating means are constituted by portions of the aforementioned single unit, provided with light-admitting openings of preselected shape. The light-admitting opening of the first light-attenuating means (which admits light onto the light detector of the diaphragm control circuit) may be a trumpet- or teardrop-shaped slit. The openings of the second light-attenuating means (which admits light onto the light detector of the exposure-duration control circuit) and of the diaphragm itself may have a preselected shape such that in a lower first scene-light range a medium diaphragm setting is established, in a second scene-light range the diaphragm setting is progressively varied to its maximum-aperture value, in a third scene-light range the diaphragm setting is progressively varied to its minimum-aperture value, and in a fourth scene-light range the diaphragm setting is maintained at its minimum-aperture value.

However, it is also contemplated that, with increasing scene-light brightness, the setting of the diaphgram progressively vary from its maximum-aperture value to its minimum-aperture value, either linearly or with non-constant rate of change.

Preferably, the error signal used to actuate the adjusting motor of the diaphragm control system is furnished at the output of a light-dependent bridge circuit containing in one of its branches the aforementioned first light detector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 depicts an exemplary embodiment of the invention; and

FIG. 2 graphically depicts the manner in which the diaphragm setting varies as a function of scene-light brightness.

DESCRIPTION OF THE PREFERRED EMBODIMENTS

In FIG. 1, numeral 1 denotes a battery and numeral 2 a battery-connect switch. The illustrated system includes a negative-feedback control circuit for automatic diaphragm-setting adjustment, and a control circuit operative for automatically selecting exposure duration and also indicating scene-light sufficiency.

The diaphragm-control circuit comprises a light-sensitive bridge formed by a photoresistor 3 and resistors 4, 5, 6. When the voltage at the junction of elements 3, 4 deviates from that at the junction of elements 5, 6, the non-zero output voltage developed across the bridge-circuit diagonal and applied to the input of actuating stage 7 causes an actuating signal to be applied to an adjusting motor 8, and the output shaft 9 of the latter turns in one or the other direction, depending upon the sense in which the light-sensitive bridge circuit is imbalanced. The adjusting motor 8 can be an ordinary rotary D.C. motor, in which case the actuating stage 7 furnishes an analog actuating signal. Preferably, however, the adjusting motor 8 is a digitally controlled stepper motor, and the actuating stage 7 converts the analog error signal at the bridge-circuit output diagonal into a series of forward-rotate or backward-rotate stepper-motor energizing pulses, in per se conventional manner.

Pivotally mounted on the output shaft 9 of adjusting motor 8 is a plate 10. Plate 10 is provided with first light-attenuating means forming a trumpet- or teardrop-shaped opening 11 located in front of photoresistor 3, second light-attenuating means provided with a light-attenuating opening 12 located in front of an exposure-timing photoresistor 13, and with a diaphragm aperture opening 14. The shape of opening 12 corresponds to the shape of opening 14, but differs from that of opening 11.

Photoresistor 13 is connected in series with a timing capacitor 15 and an indicator resistor 16. A transistor switch 17 is connected across timing capacitor 15, for short-circuiting the latter. Likewise, a transistor switch 20 is connected across indicator resistor 16, for short-circuiting the latter. The series combination of capacitor 15 and resistor 16 is connected across the input of a control stage 18. Control stage 18 is essentially comprised of a bistable threshold circuit, such as a Schmitt trigger. When the input voltage to control stage 18 is below its threshold level, stage 18 remains in its first state; when the input voltage thereto rises above the threshold level, stage 18 converts to its second state. A mode-selection switch 19 selects either a light-sufficiency-indicating mode or the actual exposure mode. A shutter-control magnet 21 and a light-emitting diode 22 are connected to the output of control stage 18.

Prior to the performance of an exposure operation, switch 19 is in its illustrated open setting. When switch 19 is open, (non-illustrated) circuitry within stage 18 keeps transistor 17 conductive and transistor 20 non-conductive. Accordingly, timing-capacitor 15 is short-circuited, and photoresistor 13 together with indicator resistor 16 form a light-dependent voltage divider, the tap voltage of which is applied to the input of the threshold circuit within stage 18. If the scene light is sufficient for the making of an exposure, the tap voltage applied to stage 18 will exceed the threshold level of stage 18, and the stage 18 will be in the state thereof in which LED 22 is illuminated, providing the user with an indication of scene-light sufficiency. If the scene-light level is insufficient, the voltage applied to stage 18 from the tap of light-dependent voltage divider 13, 16 will be below the threshold level of stage 18; accordingly, stage 18 will be in the state thereof in which LED 22 is not illuminated.

To intiate an exposure, the user depresses the (non-illustrated) shutter release. This causes the shutter to open, thereby initiating the exposure, and also causes switch 19 to close. When switch 19 is closed, transistor 20 is kept conductive and transistor 17 non-conductive, thereby short-circuiting indicator resistor 16 and permitting timing capacitor 15 to begin to charge through photoresistor 13. Initially, i.e., at the start of the exposure, the voltage applied at the upper electrode of capacitor 15 to the input of control stage 18 is below the threshold level, and stage 18 stays in its first state, and the shutter-closing electromagnet 21 stays in its first energization state. When, after capacitor 15 has charged for a length of time, the input voltage to stage 18 reaches the threshold level, stage 18 converts to its second state and the shutter-closing electromagnet 21 likewise converts to its second energization state, causing the (non-illustrated) shutter mechanism to close.

In the illustrated embodiment, the shape of the opening 12 of the second light-attenuating means is the same as the shape of the opening 14 which defines the size of the aperture opening of the camera diaphragm. Accordingly, the variation in the fraction of light transmitted onto photoresistor 13 by opening 12, as plate 10 pivots, matches the variation in the fraction of incident light transmitted onto the camera film by diaphragm opening 14.

The relationship between the light-transmitting operation of light-attenuation means 12 and of diaphragm opening 14 is particularly easy to visualize for the illustrated embodiment, wherein the shape of openings 12 and 14 is identical. However, a more general description is also possible, i.e., for the case where a different type of diaphragm mechanism might be employed, for example if the second attenuating means 12 and the diaphragm structure were entirely distinct units, although both driven by motor 8. In that event, the relationship in question can be expressed in terms of the fractional-light-transmission versus motor-position relationship of second light-attenuating means 12 and that of the diaphragm. In particular, as the birghtness of scene light varies, and therefore as adjusting motor 8 operates, the variation in the fraction of incident scene light transmitted by attenuating means 12 onto photoresistor 13 is proportional to the variation in the fraction of incident scene light transmitted through the diaphragm opening onto the camera film. In contrast, the variation in the fraction of incident scene light transmitted by attenuating means 12 onto photoresistor 13 is not proportional to the variation in the fraction of incident scene light transmitted by attenuating means 11 onto photoresistor 3. When referring to the fraction of scene light transmitted by attenuating means 12 and diaphragm 14, it will be understood that, for the sake of definiteness, these fractions can be expressed relative to the light transmitted when attenuating means 12 and diaphragm 14 are in their largest-opening settings, constituting 100% transmission of scene light.

In the illustrated embodiment, the openings 11, 12 and 14 are configured to implement the relationships depicted in FIG. 2. When the scene-light intensity E is anywhere below the value E1, the diaphragm setting is kept at 5.6. However, automatic exposure-duration variation can occur; i.e., an increase in scene-light brightness results in a change in the amount of light incident upon photoresistor 13. When the scene-light intensity is in the range between E1 and E2, the diaphragm setting progressively varies between 5.6 and 2.8 (the largest-aperture setting). Here, too, automatic exposure-duration variation can occur. In the range between E2 and E3, the diaphragm setting is kept at 2.8, and exposure-duration variation can vary. In the range between E3 and E4, the diaphragm setting is varied progressively between 2.8 and 8 (the minimum-aperture value), and the exposure duration can vary. In the range above E4, the diaphragm setting is kept at 8, and the exposure duration can vary.

It will be understood that each of the elements described above, or two or more together, may also find a useful application in other types of circuits and constructions differing from the types described above.

While the invention has been illustrated and described as embodied in a particular type of diaphragm and exposure-duration control system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera, in combination, an adjusting motor having an output element; an adjustable diaphragm coupled to and driven by the motor output element, and operative when adjusted by the motor for transmitting onto film in the camera a fraction of incident scene light which varies as a function of the position of the motor output element; first light-sensitive means positioned to receive scene light; first light-attenuating means coupled to and driven by the motor output element, and operative when adjusted by the motor for transmitting onto the first light-sensitive means a fraction of incident scene light which varies as a function of the position of the motor output element; negative-feedback control means connected to the first light-sensitive means and to the adjusting motor and operative for energizing the motor in a sense keeping the amount of light incident upon the first light-sensitive means negative-feedback regulated; second light-sensitive means positioned to receive scene light; second light-attenuating means coupled to and driven by the motor output element, and operative when adjusted by the motor for transmitting onto the second light-sensitive means a fraction of incident scene light which varies as a function of the position of the motor output element; and exposure duration control means connected to the second light-sensitive means and operative for automatically establishing an exposure duration dependent upon the amount of light incident upon the second light-sensitive means, the fraction of incident scene light transmitted by the adjustable diaphragm varying with changing position of the motor output element throughout the entirety of at least one predetermined range of positions of the motor output element, the variation in the fraction of incident light transmitted by the first light-attenuating means as a function of changing motor output element position within said predetermined range of positions being non-proportional to the variation in the fraction of incident light transmitted by the adjustable diaphragm as a function of changing motor output element position within said predetermined range of positions.

2. In a photographic camera as defined in claim 1, the variation in the fraction of light transmitted by the second light-attenuating means and by the adjustable diaphragm as a function of changing motor output element position being such that in a first range of scene-light brightness values the diaphragm is kept at an intermediate aperture value, in a higher second such range the diaphragm is kept at an extreme aperture value, and in an intermediate such range the diaphragm setting varies progressively between the intermediate aperture value and the extreme aperture value as a function of the position of the motor output element.

3. In a photographic camera as defined in claim 2, the negative-feedback control means including a light-dependent bridge circuit one of the branches of which contains the first light-sensitive means, and means for actuating the adjusting motor in dependence upon the error signal developed across the output diagonal of the bridge circuit.

4. In a photographic camera as defined in claim 2, in said intermediate range the diaphragm setting varying progressively from said extreme aperture value to the other extreme aperture value of the diaphragm setting and from said other extreme value progressively to said intermediate value.

5. In a photographic camera as defined in claim 1, the variation in the fraction of incident scene light transmitted by the second light-attenuating means as the motor output element changes position being proportional to the variation in the fraction of incident scene light transmitted by the adjustable diaphragm at least within said predetermined range of positions of the motor output element.

6. In a photographic camera as defined in claim 5, the variation in the fraction of incident scene light transmitted by the second light-attenuating means as the motor output element changes position being proportional to the variation in the fraction of incident light transmitted by the adjustable diaphragm throughout the entire range of all positions of the motor output element.

7. In a photographic camera as defined in claim 1, the adjusting motor being a rotary motor having a rotating output element, the adjustable diaphragm, the first light-attenuating means and the second light-attenuating means being constituted by different apertured portions of a pivotally mounted one-piece structure coupled to and driven by the motor output element.

8. In a photographic camera as defined in claim 7, the aperture of the first light-attenuating means being generally teardrop- or trumpet-shaped, and the aperture of the second light-attenuating means having a shape the same as the aperture of the adjustable diaphragm but different from the aperture of the first light-attenuating means.

* * * * *